(12) United States Patent
Brücklmayr et al.

(10) Patent No.: US 7,260,690 B2
(45) Date of Patent: Aug. 21, 2007

(54) MICROPROCESSOR CIRCUIT FOR DATA CARRIERS AND METHOD FOR ORGANIZING ACCESS TO DATA STORED IN A MEMORY

(75) Inventors: Franz-Josef Brücklmayr, Kaufering (DE); Hans Friedinger, München (DE); Holger Sedlak, Egmating (DE); Christian May, München (DE)

(73) Assignee: Infineon Technologies AG, Munich (DE)

( * ) Notice: Subject to any disclaimer, the term of this patent is extended or adjusted under 35 U.S.C. 154(b) by 324 days.

(21) Appl. No.: 10/635,599

(22) Filed: Aug. 6, 2003

(65) Prior Publication Data

US 2004/0088509 A1    May 6, 2004

Related U.S. Application Data

(63) Continuation of application No. PCT/DE02/00256, filed on Jan. 25, 2002.

(30) Foreign Application Priority Data

Feb. 6, 2001   (DE) ................................ 101 05 284

(51) Int. Cl.
   *G06F 12/14*    (2006.01)
(52) U.S. Cl. ....................... 711/152; 711/163
(58) Field of Classification Search ...................... None
   See application file for complete search history.

(56) References Cited

U.S. PATENT DOCUMENTS 5,600,818 A * 2/1997 Weikmann ................. 711/163

5,657,475 A * 8/1997 Gillespie et al. ............ 711/163
5,845,331 A   12/1998 Carter et al. ................ 711/163
5,890,189 A    3/1999 Nozue et al.
6,009,453 A   12/1999 Sakaki (Continued)

FOREIGN PATENT DOCUMENTS

DE         199 25 195 A1    12/2000

(Continued)

OTHER PUBLICATIONS

Beutelspacher, A. et al.: "Chipkarten als Sicherheitswerkzeug", [Smart Card as a Safety Tool], Springer Verlag, 1991, pp. 8, 75-87.

*Primary Examiner*—T Nguyen
(74) *Attorney, Agent, or Firm*—Laurence A. Greenberg; Werner H. Stemer; Ralph E. Locher (57) ABSTRACT

A microprocessor circuit for organizing access to data or programs stored in a memory has a microprocessor, a memory for storing an operating system, and a memory for storing individual external programs. A plurality of memory areas with respective address spaces is provided in the memory for storing the external programs. Each address space is assigned an identifier. The identifier assigned to a memory area is loaded into a first auxiliary register prior to the addressing of the memory area and the identifier of the addressed memory area is loaded into a second auxiliary register. A comparison of the contents of the first and second auxiliary registers is performed. Furthermore, each address space of a memory area is assigned at least one bit sequence defining access rights, whereby code instructions and sensitive data can be protected against write accesses from other external programs.

28 Claims, 6 Drawing Sheets

U.S. PATENT DOCUMENTS

| | | | |
|---|---|---|---|
| 6,047,354 A * | 4/2000 | Yoshioka et al. | 711/118 |
| 6,745,307 B2 * | 6/2004 | McKee | 711/163 |
| 6,795,905 B1 * | 9/2004 | Ellison et al. | 711/163 |
| 6,823,433 B1 * | 11/2004 | Barnes et al. | 711/163 |
| 6,848,038 B1 * | 1/2005 | Bohler | 711/163 |
| 6,854,039 B1 * | 2/2005 | Strongin et al. | 711/163 |
| 6,868,471 B1 * | 3/2005 | Kota | 711/2 |

FOREIGN PATENT DOCUMENTS

| | | |
|---|---|---|
| EP | 0 512 542 A2 | 11/1992 |
| JP | 59063097 A | 4/1984 |
| JP | 61-37540 | 3/1986 |
| JP | 5-173890 | 7/1993 |
| JP | 07302226 A | 11/1995 |
| JP | 08272625 | 10/1996 |
| JP | 09160831 A | 6/1997 |
| JP | 9-311821 | 12/1997 |
| JP | 2001005726 A | 1/2001 |
| RU | 2 126 168 C1 | 2/1999 |
| SU | 1 156 078 A | 5/1985 |
| WO | 81/02477 | 9/1981 |

* cited by examiner

FIG 3

| Address Beginning | Address Block Length | ACR | |
|---|---|---|---|
| | | W W R | Data A2 (Initialization Data) |
| | | W W W | Data A1 |
| | | Xn - - | Function A2 |
| | | - - Xn | Function A1 |
| | | W W R | Data B |
| | | Xs - - | Function B2 |
| | | Xs - - | Function B1 |

FIG 4

| Lower Address | Upper Address | ACR |
|---|---|---|
| | | |
| | | R W |
| | | |
| | | |
| | | R W W |
| | | |
| | | |

FIG 5

| Possible Access Rights | |
|---|---|
| W | Write/Read Right |
| R | Read-Only Right |
| - | No Right |
| Xn | Execution Right |
| Xs | Execution Right |

MICROPROCESSOR CIRCUIT FOR DATA CARRIERS AND METHOD FOR ORGANIZING ACCESS TO DATA STORED IN A MEMORY

CROSS-REFERENCE TO RELATED APPLICATION

This application is a continuation of International Application No. PCT/DE02/00256, filed Jan. 25, 2002, which designated the United States and was not published in English.

BACKGROUND OF THE INVENTION

Field of the Invention

The invention relates to a microprocessor circuit for organizing access to data or programs stored in a memory. The circuit has a microprocessor, a first memory for storing an operating system and a second memory for storing individual external programs. The second memory has a plurality of memory areas defined by address spaces and each of the address spaces is assigned an identifier. A device is provided which loads the identifier of a memory area into a first register and loads the identifier of a to be addressed memory area into a second register. The device then compares the identifiers in the two registers.

Microprocessor circuits of the aforementioned type are preferably used in so-called smart cards, that is to say identity cards, credit cards, charge cards and the like, which are equipped with an integrated circuit. The microprocessor circuits can also be used in so-called payment transaction modules that communicate with the above-mentioned cards via corresponding interfaces. Generally, the microprocessor circuit can be used in personalized terminals, such as, for example, mobile phones, PCs or PDAs, which are suitable for the payment transaction.

One of the essential advantages of such a card relates in the diverse uses that are possible for the card holder. The microprocessor contained in the integrated circuit and an associated storage device allow extensive data processing in the card itself.

The card manufacturer can equip the microprocessor with a resident operating system which performs basic functions, for example procedures for comparing a code input externally with a stored code and the like. The memories associated with the microprocessor serve not only for storing the operating system but also for storing particular applications, which may contain a plurality of functions, and parameters which are necessary for example for security checking and must at all events be kept secret.

Diverse application of the cards is achieved when an operating system with associated programs forms a starting point, certain interfaces are defined and a memory or memory area is reserved for an external program. The card manufacturer then provides for the user, that is to say for the organization which issues cards, a memory or memory area for programming in its external program. In the external program, the organization can then define specific operations that are independent of the operating system and relate only to the. specific organization.

A future scenario might be that not only a single organization stores its external program in the prefabricated smart card, rather a plurality of different organizations store their corresponding programs on the smart card. In this case, care must be taken to ensure that security-relevant data that are part of the operating system or else of the individual external programs are protected against unauthorized access.

It is conceivable for an external program to call a program part, also called program library, of another external program. On the basis of a customary memory organization, all of the program parts may be situated in what is referred to as the same logical address area. In this case, both code and data of an external program are situated in an address space of a memory area. In this case, the code itself may in turn contain a plurality of program parts, the libraries or functions. By way of example, if an external program A also called application, alternately calls a program library B of an external program B and a program library C of a further external program C in the same logical address space, then in the absence of a further protection mechanism the program library B might be destroyed.

In order to solve this problem, it is known for the program parts, that is to say the program libraries, to be separated from one another by hardware mechanisms in the memory and for data accesses between the program libraries to be allowed only via the operating system. However, the security achieved as a result is manifested in a high programming complexity and in complex hardware. Moreover, the performance is reduced compared with direct communication between the program libraries. Consequently, high security is attained to the detriment of performance.

European Patent EP 0 512 542 B1, corresponding to U.S. Pat. No. 5,600,818, discloses a microprocessor circuit for preventing access to data or programs stored in memories, which has at least one microprocessor, a memory for an operating system and at least one memory for free programming with individual external programs. In this case, a plurality of freely programmable memory areas are provided, whose address spaces are identical except for at least one most-significant location. The microprocessor circuit furthermore has the capability to load the respective most-significant location assigned to a memory area into a first auxiliary register in each case prior to the addressing of a memory area and load the respective most-significant location of the addressed memory area into a second auxiliary register and which then performs a comparison of the first and second auxiliary registers. In the event of a change in the auxiliary register content, an inhibit signal is generated in order thereby to establish whether an external program which is address is being executed.

This procedure has the disadvantage that, in principle, access to another external program is prevented. Reciprocal utilization of specific program parts of other external programs is not possible. Consequently, if appropriate, a plurality of external programs must contain identical program parts with the same functionality. This is extremely disadvantageous, however, in the case of portable data carriers, which generally have only a limited memory area.

SUMMARY OF THE INVENTION

It is accordingly an object of the invention to provide a microprocessor circuit for data carriers and a method for organizing access to data stored in a memory that overcome the above-mentioned disadvantages of the prior art devices and method of this general type, which enable access to external programs using simple measures.

With the foregoing and other objects in view there is provided, in accordance with the invention, a microprocessor circuit for organizing access to data or stored programs. The microprocessor circuit contains at least one microprocessor, and a memory connected to the microprocessor. The memory contains a first memory storing an operating system, and at least one second memory for storing individual external programs. The second memory has a plurality of memory areas defining address spaces, and each of the address spaces is assigned an identifier and at least one bit sequence defining access rights. First and second auxiliary registers are provided. A unit is connected to the first and second auxiliary registers. The unit loads the identifier assigned to a respective memory area of the memory areas into the first auxiliary register in each case in an event of a memory access prior to an addressing of a to be addressed memory area and for loading the identifier of the to be addressed memory area into the second auxiliary register and performs a comparison of the first and second auxiliary registers.

According to the invention, the object is achieved by virtue of the fact that each address space of a memory area is assigned at least one bit sequence containing access rights (ACR). To put it another way, each logical address space is subdivided into at least one address block which is assigned a bit sequence containing the access rights.

The invention thus provides a hardware protection mechanism that allows direct communication between program parts of different external programs situated in the same logical address space. In this case, however, there is no need for control by the operating system.

In an advantageous refinement of the invention, each address of an address space is assigned a bit sequence containing access rights. In other words, both a code row and a data word are assigned a bit sequence containing the access rights. Consequently, selectively determined data areas can be allocated a desired right.

The bit sequences containing the access rights are advantageously stored together with the addresses or address blocks and the identifiers (program ID) in a table stored in the memory. In this case, an address block may be identified by its address beginning or its address end and the address block length. As an alternative, it is conceivable for an address block to be identified by a lower and upper address. Each address block can then be assigned the bit sequence containing access rights. If an address block contains only an individual address, each individual instruction or each individual address can be assigned a bit sequence containing access rights.

As an alternative, each address space or each address is provided with the bit sequence containing the access rights. This results in a lengthening of the previously used word row by the length of the bit sequence containing the access rights. As a result, an access right is automatically allocated to each address, that is to say each word. In this case, the identifier of each address or of each address space may be contained for example in at least one most significant location of each address or each address of an address space.

The bit sequence containing the access rights contains a first and a second access right, the first access right regulating accesses between two memory areas and the second access right regulating accesses within a memory area. Assuming that different external programs are stored in different memory areas, an access can thus be regulated highly selectively by program parts of an external program. An access can thus be refused or granted. The access itself may contain a read authorization or a write authorization, if data are involved to which the external program has recourse. If one external program attempts to call code from another external program, then regulation of rights may exist in this case, too.

In an advantageous refinement, a third (data) access right in the bit sequence regulates accesses within a memory area, that is to say within a single program. This is coupled with the second access right of the dedicated program. In particular it is then possible to protect sensitive data, for example initialization data or variables, against a read or write access of specific program parts within the dedicated program, if the second access right of the executing code in the dedicated program is not set. However, other data areas that merely contain those data that arise during execution could be written to or read by all of the program parts, for example.

In a further advantageous refinement a rights buffer is provided, which contains further access rights between two memory areas, in which case the access rights can be read out or written by the operating system. The buffer preferably contains allowed assignments, that is to say allowed accesses, between two different memory areas in each case. This refinement provides the introduction of an access table that may be realized for example in the form of a cache (buffer). The assignments are realized in the table by the identifiers (program IDs) or by a translation table that can be used to determine the respective identifiers.

As a result, a first application containing a plurality of program parts may grant more access rights to a second program part than, for example, to a third program part. For this purpose, the buffer or the table stored in the buffer contains, for example, two columns and a corresponding number of rows depending on the complexity or the number of program parts. In one row, an identifier for the program part that is being accessed is provided in the first column and an identifier for the program part that is to be allowed to affect the access is provided in the second column. In the simplest realization, these identifiers are identical to the program IDs. As an alternative, however, a translation table could also be provided that could be used to determine the program IDs from other table entries.

An access table realized in the rights buffer can be realized in different ways. In the case of a two-column table, each combination of different program parts is permitted to occur once at most. As an alternative, the table may contain a number of, program parts corresponding to the number of program parts. Allowed accesses are then stored by use of additional columns in the table.

In a further advantageous refinement, a memory area that can be managed exclusively by the operating system is provided. The memory area that is managed by the operating system, which is referred to as "Context Safe Area", serves for buffer-storing sensitive data that are not permitted, to be read or written by any other external program or program parts thereof. The memory area that is managed exclusively by the operating system thus constitutes a stack used, in particular, by that code whose third access right is available only to specially selected program parts.

In a further refinement, each memory area is assigned an address area for buffer-storing data, which can be managed only by the program stored in the respective memory, area. The buffer (stack) also serves, for buffer-storing particularly sensitive data that must not under any circumstances be read by other external programs.

The above-described configuration of the microprocessor circuit will become better understood with reference to the method described further below.

The method organizes access to data or programs stored in a memory. At least one microprocessor, a memory for an operating system, and, at least one memory for free programming with individual external programs, is provided. A plurality of memory areas with respective address spaces are provided in the memory for free programming. Each address space is assigned an identifier (program ID), and exactly one external program is provided in each memory area. The method includes the following steps:

a) determining the first program ID of the currently executed code instruction of an external program using the identifier of the current address (PC) at that time;

b) determining the second program ID of the addressed memory area;

c) comparing the first and second program IDs;

d) selecting the first or second access right depending on the result of the comparison in step c);

e) evaluating the access right;

f1) continuing the program code if the access of code instruction to the addresses memory area is allowed;

f2) calling an error handling routine if the access or code instruction to the addressed memory area is not allowed.

Consequently, using the identifier (also referred to as program ID hereinafter), e.g. the most significant location or locations, it can be determined whether or not an access is being made to the same or to a different memory area and thus to a different external program. Depending on the evaluation, the first or second access right is determined and evaluated. On the basis of this method, it is possible for specific program parts (program libraries) to be made usable for other external programs.

In a refinement of the method according to the invention, given identical first and second program IDs, the second access right or a third access right is selected depending on the access right of the currently executed code instruction. The access—rights assigned to a code instruction specify whether the latter—is also permitted to access sensitive areas of the program code. If this is the case, then the selected third access right assigned to the address is evaluated further and it is stipulated whether a write access is merely a read access can be effected. This ensures protection that prevents destruction of the sensitive data by program libraries of the currently executed external program.

In a further advantageous refinement of the method according to the invention, after step f2, the following steps are executed:

checking the rights buffer for an entry which represents an allowed access of the memory area with the first program ID ($PID_{PC}$) to the memory area identified by the second program ID ($PID_{addr}$), continuing the program code if the entry is present in the rights buffer, calling an error handling routine if the entry is not present.

This advantageous variant of the method according to the invention makes it possible, by use a rights buffer, for more access rights to be granted to the first program part, for example, than to a second program part.

If a first program part accesses a second program part, the first, second and third access rights are checked. If the access is allowed, then it is executed in accordance with the respective rights. However, if the access is not allowed, then the contents of the rights buffer is checked in respect of whether there is an entry for an access of the first program part to the second program part. If such an entry is present, an extended access right to the second program part is granted to the first program part, for example. If such as entry is not present in the rights buffer, an error handling routine is initiated.

In an advantageous refinement of the method according to the invention, if the code instruction is a jump instruction, the following steps are then executed:

b) determining the second program ID of the addressed memory area;

c) comparing the first and second program ID;

d) jumping to the called address;

e1) continuing the program code at the addressed memory area if the first and second program IDs are identical;

e2) reading at the address content of the addressed content if the first and second program IDs are not identical;

f1) calling an error handling routine if the address content read out is not an entry instruction;

f1) continuing the program code if the address content read out is an entry instruction.

This procedure ensures that jumps between the program libraries are permitted to be affected only at previously stipulated entry addresses, which are defined by a stipulated entry instruction. Consequently, an uncontrolled entry to an arbitrary location of the program code is impossible. Both covert discovery and destruction of data thus become impossible.

In a further refinement of the method, the address under which the jump instruction is stored is stored on a buffer.

The buffer is advantageously a memory that is managed only by the operating system, the "Context Safe Area" mentioned in the introduction.

The entry instruction is advantageously a fixedly prescribed bit sequence. The latter can be used to identify whether or not an entry address is involved.

Furthermore, it is expedient if a publicly accessible buffer (stack) is available as the buffer to code instructions that are assigned a first execution right. The code instructions are program code that does not or cannot access the sensitive data of a program.

On the other hand, a buffer that is assigned to the respective memory area and can only be managed by the program stored in the respective memory area is advantageously used by code instructions that are assigned a second execution right. This buffer, referred to as a "Sensitive Stack", serves for buffer-storing data that must not under any circumstances be read or overwritten external programs.

Other features which are considered as characteristic for the invention are set forth in the appended claims.

Although the invention is illustrated and described herein as embodied in a microprocessor circuit for data carriers and a method for organizing access to data stored in a memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
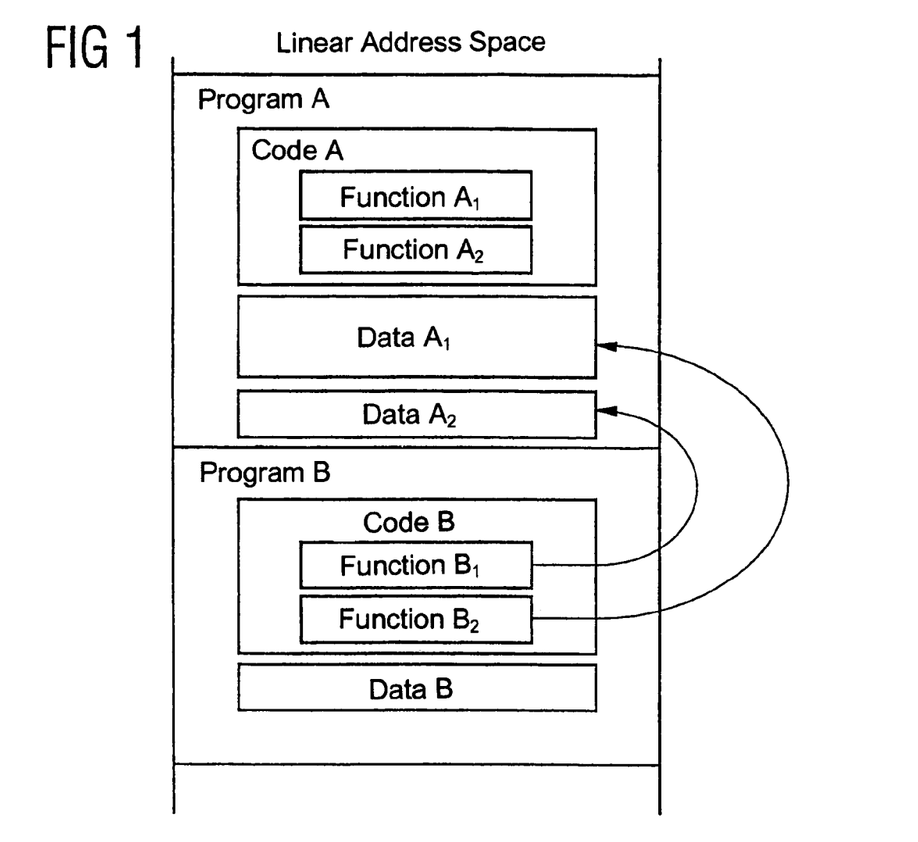
FIG. 1 is an illustration showing the division of a linear address space with two programs A and B.

Referring now to the figures of the drawing in detail and first, particularly, to FIG. 1 thereof, there is shown by way of example, the problem area on which the invention is based. There are two programs A and B situated in a linear address space. It is assumed that program parts or program libraries belonging to the program A, with the associated volatile and fixedly prescribed data, are configured in such a way that they do not destroy themselves by reciprocal calling and reciprocal management. In FIG. 1, the program A contains an area which merely includes instruction code and which is identified by code A. The latter may contain a plurality of mutually independent functions A1, A2. The latter can reciprocally call one another. Furthermore, the program A contains, by way of example, two data areas A1, A2 which may contain volatile or permanent data. All the data situated in the program A can be completely managed and controlled by the instruction code or the functions.

The program B is structured in a corresponding manner, only one data area B being illustrated by way of example in the FIG. 1. The functions situated in the program B can also reciprocally call one another and manage and control the data stored in the data area B.

According to the invention, the program A and the program B are situated in a respectively predetermined memory area that differs either through the most significant location or locations or through the respectively assigned program ID (PID). Within the memory area, it is not necessary, of course, for the instruction code and the data to be disposed in blocks in the manner shown in the FIG. 1.

Figure 2:
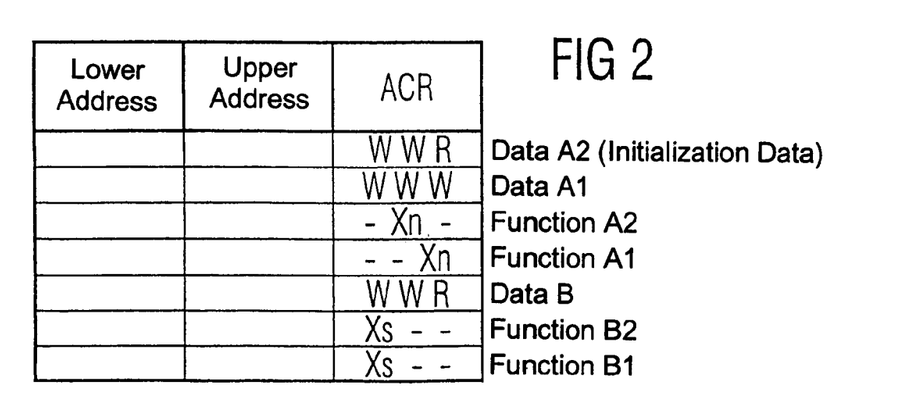
FIG. 2 is a table showing a first exemplary embodiment of access rights.

The invention now opens up a possibility enabling a function of the program B to access data of the program A. By way of example, two accesses of this type are illustrated in FIG. 1. The function B1 accesses data area A2, while function B2 accesses data area A1. According to the invention, the program A, which makes the data available to the program B, can allow other programs specific access rights selectively for specific data area. Possible access rights are illustrated in FIG. 2. The following are conceivable: Write/read rights (W), a read-only right (R) and no data access right, that is to say neither read, nor write right (–). These rights are assigned to the data. So-called execution rights $X_n$ and $X_s$ are assigned to the instruction code and contain information as to whether or not the desired data area is permitted to be accessed with the currently executed instruction.

A data access of program B to program A can be checked by the hardware by the comparison of the program ID (e.g. the most-significant location or locations) of the currently executed code instructions and the accessed address.

Depending on the comparison of the program IDs, it can be established whether a data access is affected by a function within the currently executed program or by a function of a different program. According to the invention, each data area (both code instructions and data) is then assigned a bit sequence containing access rights.

Figure 3:
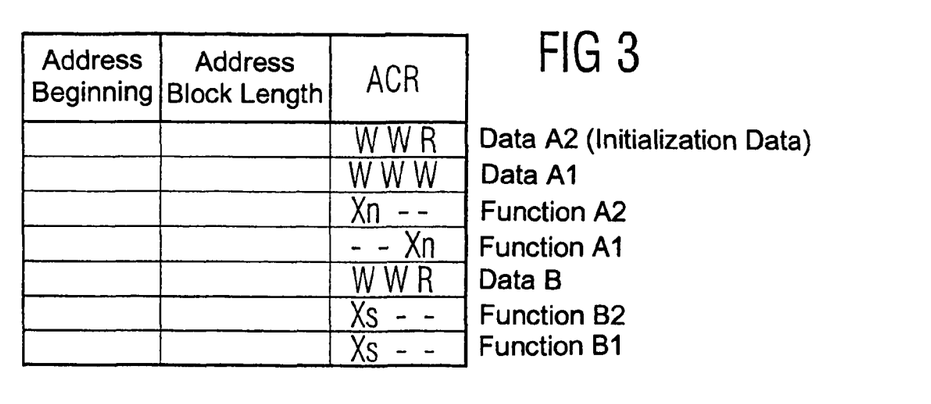
FIG. 3 is a table showing a second exemplary embodiment of the access rights.
Figure 4:
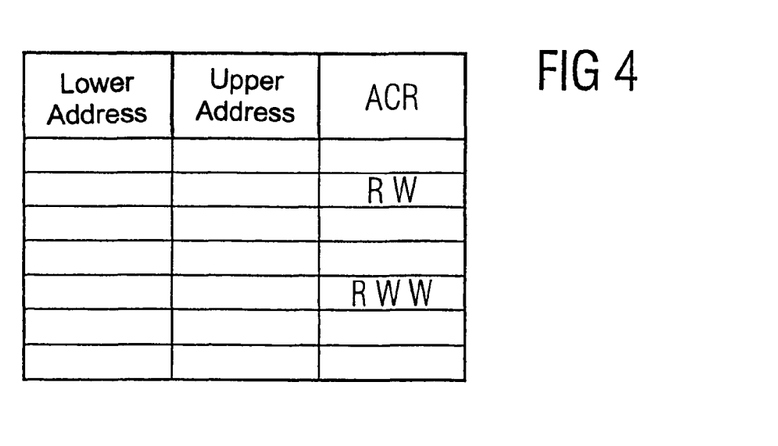
FIG. 4 is a table showing a basic design of an address area, each address being assigned a bit sequence containing access rights.
Figure 5:
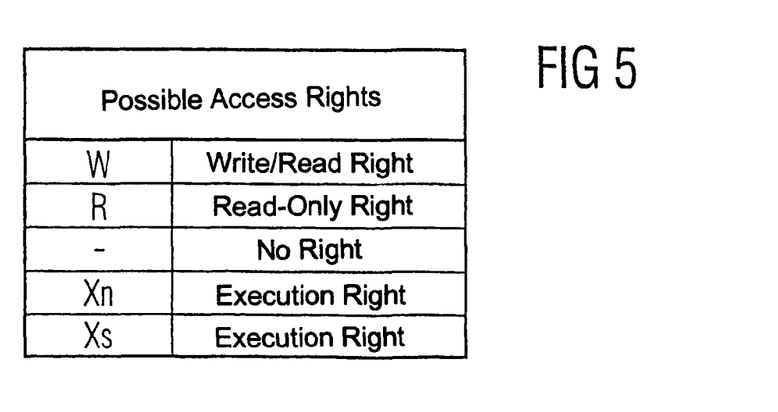
FIG. 5 is a table showing possible access rights.
Figure 6A:
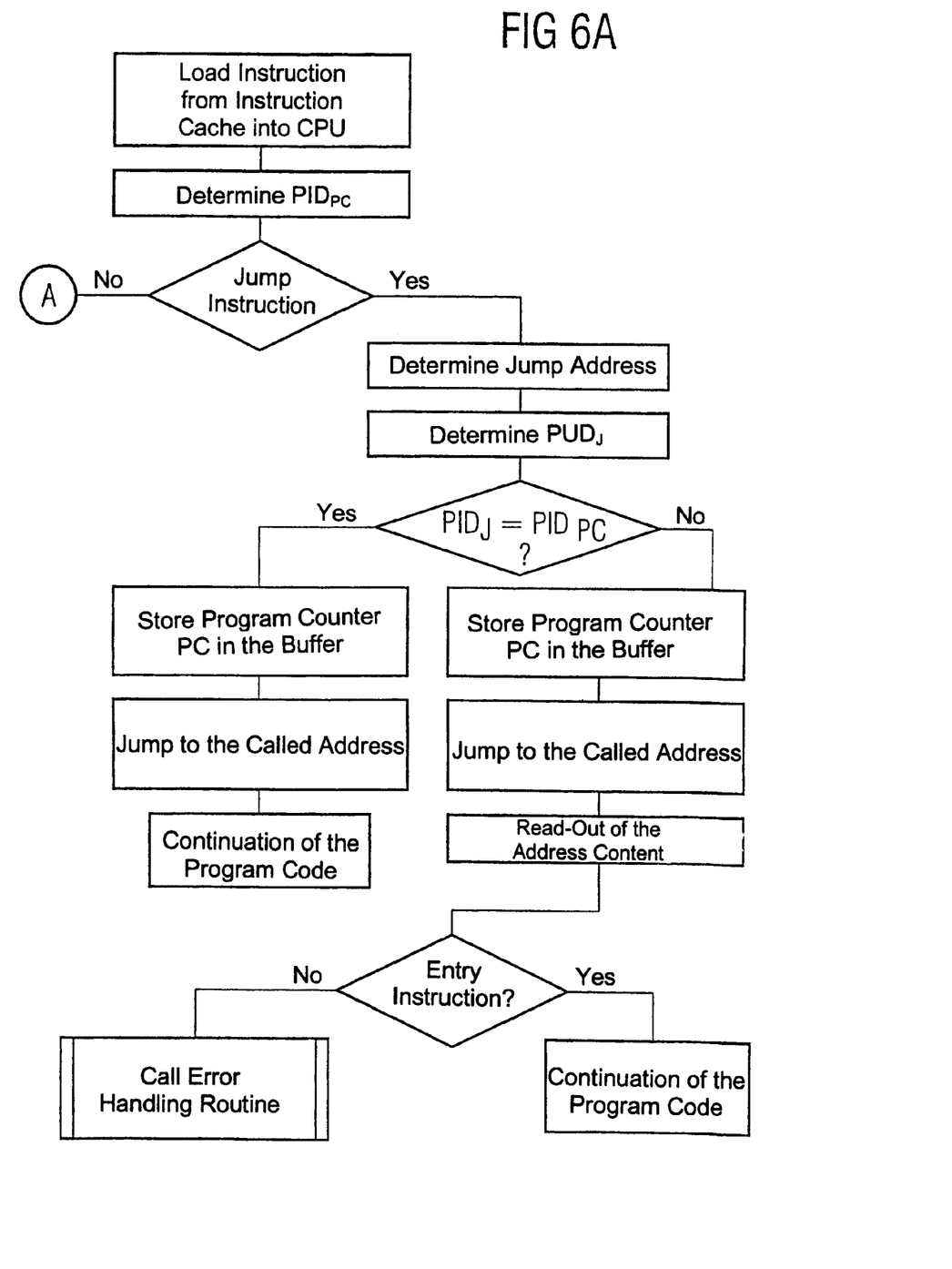
FIGS. 6A-6D are flow charts showing a method according to the invention.
Figure 6B:
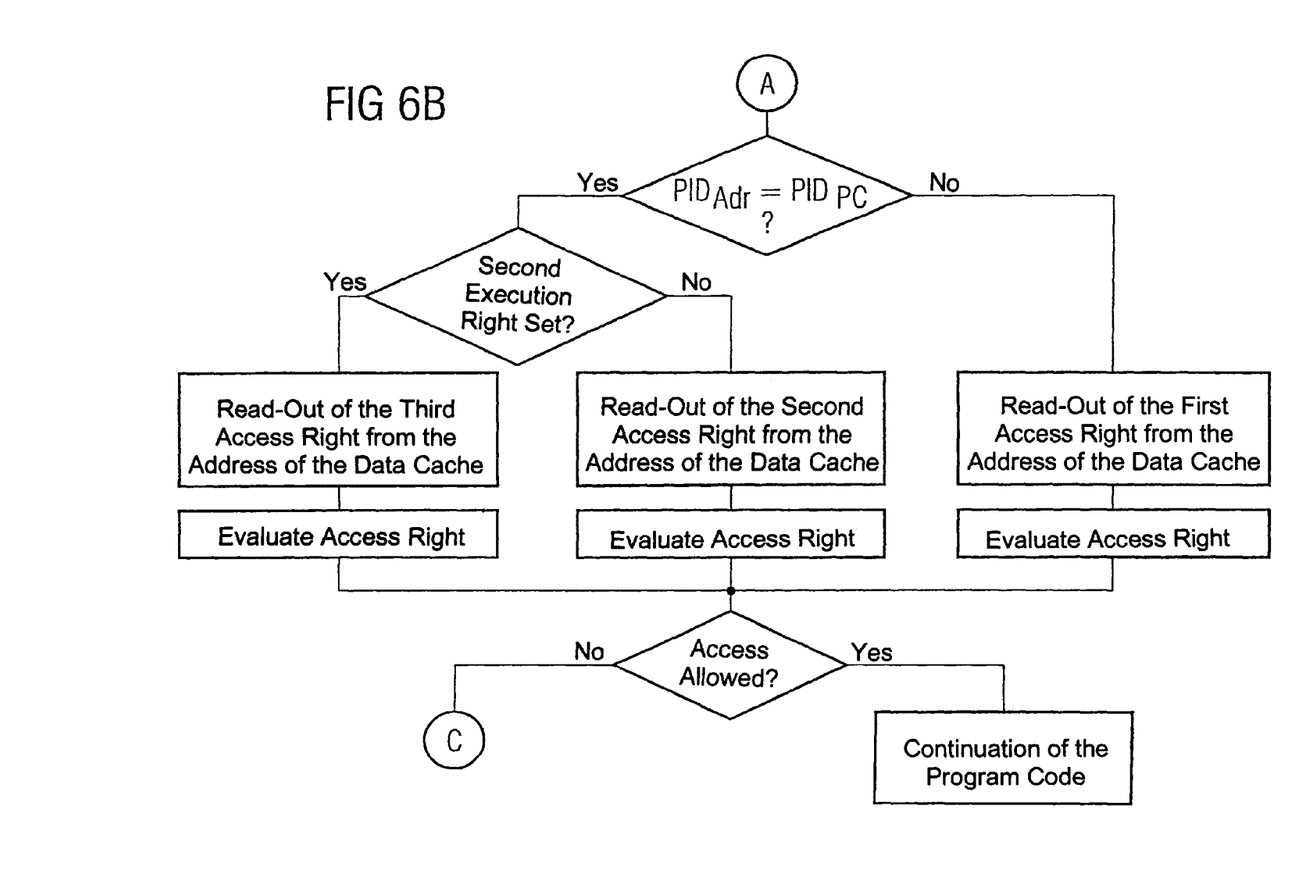
Figure 6C:
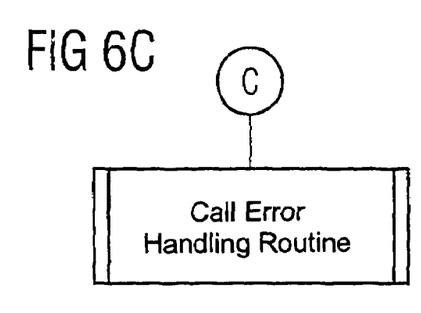
Figure 6D:
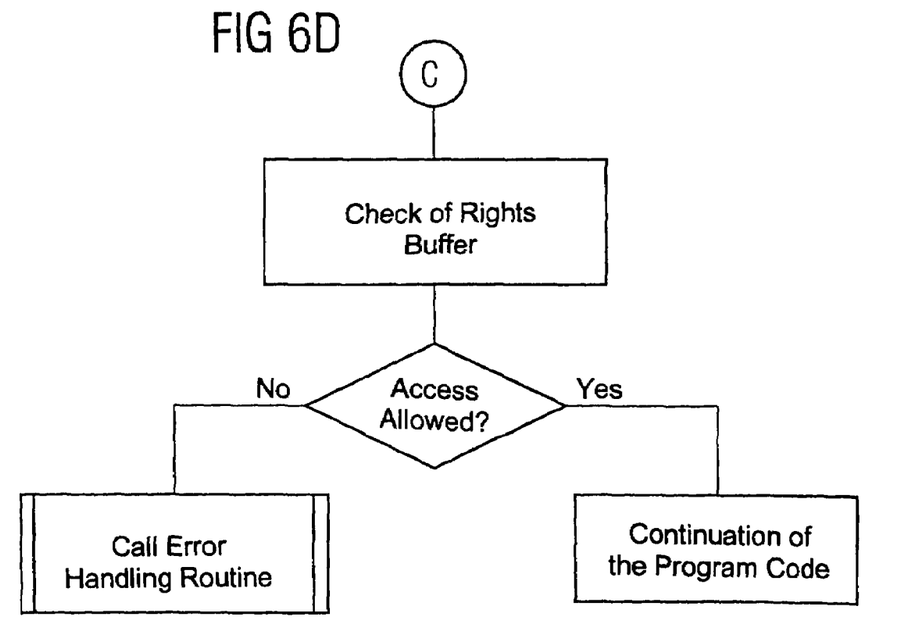

The bit sequence may be part of the word row, as is illustrated in FIG. 4. In addition to the address and the value situated therein, such a word row is lengthened by the bit sequence of the access rights (ACR). As an alternative, a table may be provided in the memory, which table defines a memory area and contains a bit sequence—assigned to the memory area—with the access rights. In this case, the address area may preferably be defined by its lower and upper, address (FIG. 2) or, as an alternative, by ,its address beginning and the address block length (FIG. 3).

The bit sequence defining the access rights includes, at least two access rights: the first access right, which regulates accesses between two programs, and the second access right, which regulates accesses within a program. The order in which the, access rights are disposed within the bit sequence (ACR) can be chosen as desired. The bit sequence containing the access rights advantageously has a further, third access right, which regulates accesses within a program. In contrast to the second access right, address areas containing sensitive data, for example initialization data, are identified thereby. In order that a code instruction is permitted to read or write to such data, the respective code instruction also requires a special identification.

The bit sequence containing the access rights in FIG. 2 has the first, second and third access rights, the latter being entered in the aforementioned order from right to left in the column ACR. The data area A2, containing the initialization data for example, is thus permitted to be read by functions of an external program (first access right: R), while functions within the current program at that time even enjoy a write right. That applies both to the code instructions which are identified with a normal, first execution right ($x_n$) and to those which have the authorization for executing sensitive data ($x_s$) (second execution right).

Furthermore, it can be gathered from the table in FIG. 2 that the data area A1 is written to by functions both within currently executed program A (first, second and third access right: W).

Consequently, by the access rights assigned to the individual data areas of the linear address space, data or functions can be made accessible to other programs in a simple manner. If the access desired by the external program is not allowed, which can be established on the basis of the access rights, then an error handling routine is initiated. In this way, the programmer himself can protect code instructions and selected data of a program against write access from other programs.

A further protection mechanism according to the invention relates to the control of function calls from external programs. In order to prevent an uncontrolled program flow in a program and thus a possible destruction through overwriting of dedicated data, a function within a program is permitted to be jumped to by other programs only at defined entry addresses. The entry addresses are identified by prescribed bit sequences. In the event of a jump instruction, the specified address is checked for the expected bit sequence. If the latter is not present, then an error handling routine is initiated. If the expected bit sequence is found, then the called function can be executed.

Since functions within a program can be called from any location, the return address must be stored for each function call. If a return instruction is encountered during the processing of the code instructions of a function, the program counter is set to the previously stored return address. The program flow within a program could be altered in an undesirable manner through manipulation of the return address.

In order to solve this problem, the invention proposes protecting the return addresses against write accesses by other programs by automatically storing the return addresses in the case of a function call in a buffer which can only be accessed by the operating system. In this case, it suffices to store on a write-protected buffer only those return addresses in the case of which the function call is affected from another program. By contrast, in the case of function calls of a function within the same program, it is possible to use a generally accessible buffer. In this case, however, it must be ensured that these return addresses do not lead out of the current program. As a further alternative, the return address in the case of the function call can be stored automatically in an intermediate register, an old value of the intermediate register being stored on the separate stack with the return addresses. Access to the intermediate register must then be just as restrictive for the called program as access to the buffer that is managed by the operating system.

The method according to the invention is again illustrated with reference to FIGS. 6A-6D. An instruction from an instruction cache is loaded into the CPU and the program ID ($PID_{PC}$) is, kept in an internal CPU register. In the next step, a check is made to determine whether the code instruction is a jump instruction. If this is the case, the program ID of the called address ($PID_J$) is determined. If the two program IDs correspond, a jump to the called address takes place and the program is continued. Identical program IDs mean that a jump is executed within the currently active program. In the case of different program IDs, the called address is jumped and the address content situated therein is read out. If the address content is the expected entry instruction, that is to say a fixedly prescribed bit sequence; the program code is continued. Otherwise, an error handling routine is called.

If the code instruction is not a jump instruction, but rather an instruction with a data access, then the program ID of the called address from the data cache is loaded into the CPU and determined. If the program IDs $PID_{PC}$ and $PID_{ADDR}$ do not correspond, then what is involved is an attempted data access of an external program. Consequently, the first access bit is determined either from the address of the data cache or from an assigned table and evaluated. If the access is allowed, for example the attempt to read out a datum, the first access right constituting R or W, then the program code is continued. If the first access bit grants neither a read nor a write authorization in the example mentioned, an error handling routine is called.

Instead of the error handling routine being called, a further check of rights may follow at this point. In a table stored in a rights buffer, entries are checked in respect of whether a right pair containing called and calling program part is present. If this is the case, by way of example, an extended access to the program part with the program ID $PID_{ADDR}$ is granted to the program part with the program ID $PID_{PC}$. It is thus possible to grant more access rights to one program part than to another program part intrinsically having the same authorization. For sensitive access rights (third access bit), however, the above-described distinction with regard to the rights is maintained. However, if no entry with the program IDs $PID_{PC}$ and $PID_{addr}$ can be found in the rights buffer, then an error handling routine is initiated.

The check of rights described in the introduction can also take place in parallel with the extended check of rights described here. Access to the called program part is allowed when the normal or the extended check of rights has turned out positive. If the two checks of rights turn out negative, an error handling routine is initiated.

In the event of corresponding program IDs $PID_{PC}$ and $PID_{ADDR}$, an access within the currently active program is involved. If the code instruction is provided with an execution right that only allows accesses to normal data, the second access bit at the address is read out from the data cache and evaluated. If the code instruction has the right also to process sensitive data, which is identified by the second execution right $x_s$, then the third access right from the bit sequence containing the access rights is read out and evaluated. In the event of an allowed access, the program code is continued in both cases mentioned. Otherwise, an error handling routine is called.

Figure 7:
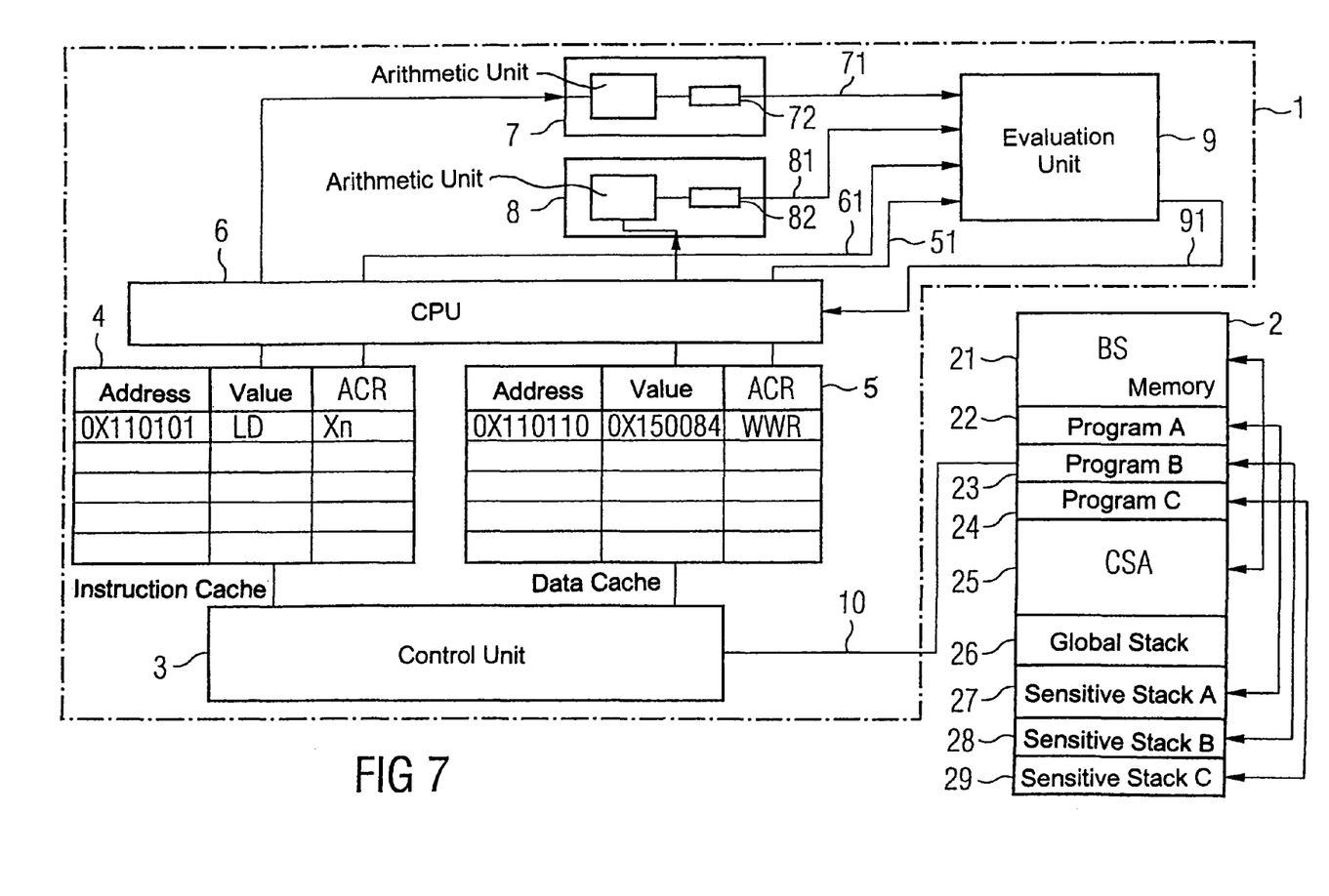
FIG. 7 is a block diagram of an exemplary embodiment of a microprocessor circuit according to the invention.

FIG. 7 shows, by way of example, the schematic construction of the microprocessor circuit according to the invention. A microprocessor 1 contains a control unit 3, which is connected to a memory configuration 2 via a control line 10. The memory contains an area 21, which is provided for the operating system, by way of example three memory areas 22, 23, 24 for respective external programs, a buffer 25 that can be managed exclusively by the operating system, a buffer 26 that can be used for all programs, and buffers 27, 28, 29 (so-called "Sensitive Stacks") which are respectively assigned to one of the memory areas 22, 23, 24 and can only be managed by the latter. The microprocessor furthermore has a central processing unit (CPU) 6, an instruction cache 4, a data cache 5, and arithmetic units 7, 8 respectively having an auxiliary register 72, 82. Furthermore, an evaluation unit 9 is present, which is coupled to the arithmetic units 7, 8 and the arithmetic/logic processing unit 6.

By the arithmetic unit 7, the program ID of the address of the currently executed code instruction is determined and stored in the auxiliary register 72. For this purpose, the address from the instruction cache 4 is fed to the arithmetic unit 7 via the arithmetic/logic processing unit 6. In a corresponding manner, the program ID of the address to be called is determined by the arithmetic unit 8 and is stored in the auxiliary register 82. The address to be called is fed to the arithmetic unit 8 from the data cache by the arithmetic/logic unit 6. The contents of the auxiliary registers 72, 82 are fed to the evaluation unit 9 and compared with one another there. This yields the statement of whether an access is to be effected between two programs or within one program. Finally, the access rights of the code instruction and of the address to be called are fed to the evaluation unit 9. Using this information, the evaluation unit 9 is able to carry out the program sequence described in FIGS. 6A-6D and to decide whether an access is to be allowed or refused. This result is fed to the CPU.

We claim:

1. A microprocessor circuit for organizing access to data or stored programs, comprising:
   at least one microprocessor;
   a memory connected to said microprocessor, said memory including:
   a first memory storing an operating system; and
   at least one second memory for storing individual external programs, said second memory containing a plurality of memory areas defining address spaces, each individual external program being stored in one memory area, with each of said address spaces being assigned an identifier and at least one bit sequence defining access rights, said at least one bit sequence defining the access rights defining a first access right and a second access right, the first access right regulating accesses between two different ones of said memory areas, each of said two different ones of said memory areas containing a single, different individual external program, and the second access right regulating accesses within a single memory area containing a single individual external program;
   a first auxiliary register;

a second auxiliary register; and a unit connected to said first and second auxiliary registers, said unit loading the identifier assigned to a respective memory area of said memory areas into said first auxiliary register in each case in an event of a memory access prior to an addressing of a to be addressed memory area and for loading the identifier of the to be addressed memory area into said second auxiliary register and performing a comparison of said first and second auxiliary registers.

2. The microprocessor circuit according to claim 1, wherein each address of an address space is assigned the at least one bit sequence defining the access rights.

3. The microprocessor circuit according to claim 1, wherein bit sequences defining the access rights are, stored together with one of addresses and address blocks and the identifiers in a table stored in said memory.

4. The microprocessor circuit according to claim 3, wherein the address blocks are each identified by one of an address beginning and an address ending and an address block length.

5. The microprocessor circuit according to claim 3, wherein the address blocks are each identified by a lower address and an upper address.

6. The microprocessor circuit according to claim 1, wherein each address space is provided with the bit sequence defining the access rights.

7. The microprocessor circuit according to claim 1, wherein the bit sequence defines a third access right, the third access right regulating accesses within the memory area.

8. The microprocessor circuit according to claim 1, further comprising a rights buffer defining further access rights between two of said memory areas, in, which case the access rights can be read out or written by the operating system.

9. The microprocessor circuit according to claim 8, wherein said rights buffer stores allowed accesses between two of said memory areas in each case.

10. The microprocessor circuit according to claim 9, wherein the accesses are realized in a table using the identifier.

11. The microprocessor circuit according to claim 9, wherein the allowed accesses are stored in an access table and that each access stored in said access table is described by at least one of identifiers stored in said access table or by a translation table used to determine the identifiers.

12. The microprocessor circuit according to claim 1, wherein said memory has an operating system memory area managed exclusively by the operating system.

13. The microprocessor circuit according to claim 1, wherein said memory has address areas and each of said memory areas of said second memory is connected to one of said address areas for storing data, and a respective address area being managed only by a program stored in a respective memory area.

14. The microprocessor circuit according to claim 1, wherein each address is provided with the bit sequence defining the access rights.

15. A method for organizing access to data or programs stored in a memory accessed by at least one microprocessor, the memory having a first memory for storing an operating system, and at least one second memory for free programming and storing individual external programs, said second memory having a plurality of memory areas defining address spaces, each of the address spaces having an identifier, and exactly one external program being provided in each of the memory areas, which comprises the steps of:

determining a first program ID of a currently executed code instruction of the external program using the identifier of a current address space at that time;

determining a second program ID of a to be addressed memory area;

comparing the first and second program IDs;

selecting an access right being one of a first access right and a second access right depending on a result of the comparing step, the first access right regulating accesses between two of the memory areas, each of the two memory areas containing a single, different individual external program, and the second access right regulating accesses within a single memory area containing a single individual external program;

evaluating the access right;

continuing a program code if the access right or the currently executed code instruction to the addressed memory area is allowed; and calling an error handling routine if the access right or the currently executed code instruction to the addressed memory area is not allowed.

16. The method according to claim 15, which further comprises selecting one of the second access right and a third access right in dependence on the access right of the currently executed code instruction if the first and second program IDs are identical.

17. The method of claim 16, which further includes, if the currently executed code instruction is a jump instruction, performing the following steps:

determining a first program ID of a currently executed jump code instruction of the external program using the identifier of a current address space at that time;

determining the second program ID of a to be addressed memory area;

comparing the first and second program IDs;

jumping to a called address;

continuing a program code at the addressed memory area if the first and second program IDs are identical;

calling an error handling routine if an address content read out is not an entry instruction; and continuing the program code if the address content read out is an entry instruction.

18. The method according to claim 17, which further comprises storing an address of the currently executed jump code instruction in a buffer before performing the jumping step.

19. The method according to claim 17, which further comprises setting the entry instruction as a fixedly prescribed bit sequence.

20. The method according to claim 18, which further comprises using the operating system to exclusively manage the buffer.

21. The method according to claim 15, which further comprises performing the following steps after performing the calling step:

checking a rights buffer for an entry representing an allowed access of a memory area with the first program ID to the memory area identified by the second program ID;

continuing the program code if the entry is present in the rights buffer; and calling the error handling routine if the entry is not present.

22. The method according to claim 21, wherein code instructions assigned to a first execution right use a publicly accessible buffer as the buffer.

23. The method of claim 21, which further includes, if the currently executed code instruction is a jump instruction, performing the following steps:

determining a first program ID of a currently executed jump code instruction of the external program using the identifier of a current address space at that time;

determining the second program ID of a to be addressed memory area;

comparing the first and second program IDs;

jumping to a called address;

continuing a program code at the addressed memory area if the first and second program IDs are identical;

calling an error handling routine if an address content read out is not an entry instruction; and     continuing the program code if the address content read out is an entry instruction.

24. The method according to claim 15, which further comprises if the currently executed code instruction is a jump instruction, performing the following steps:

determining the second program ID of the addressed memory area;

comparing the first and second program IDs;

jumping to a called address;

continuing a program code at the addressed memory area if the first and second program IDs are identical;

calling the error handling routine if an address content read out is not an entry instruction; and     continuing the program code if the address content read out is an entry instruction.

25. The method according to claim 24, which further comprises storing an address of the jump instruction in a buffer before performing the jumping step.

26. The method according to claim 24, which further comprises setting the entry instruction as a fixedly prescribed bit sequence.

27. The method according to claim 25, which further comprises using the operating system to exclusively manage the buffer.

28. The method according to claim 15, wherein code instructions assigned a second execution right, use a buffer assigned to the memory area and can be managed only by the program stored in the respective memory area and by the operating system.

\* \* \* \* \*